UNITED STATES PATENT OFFICE.

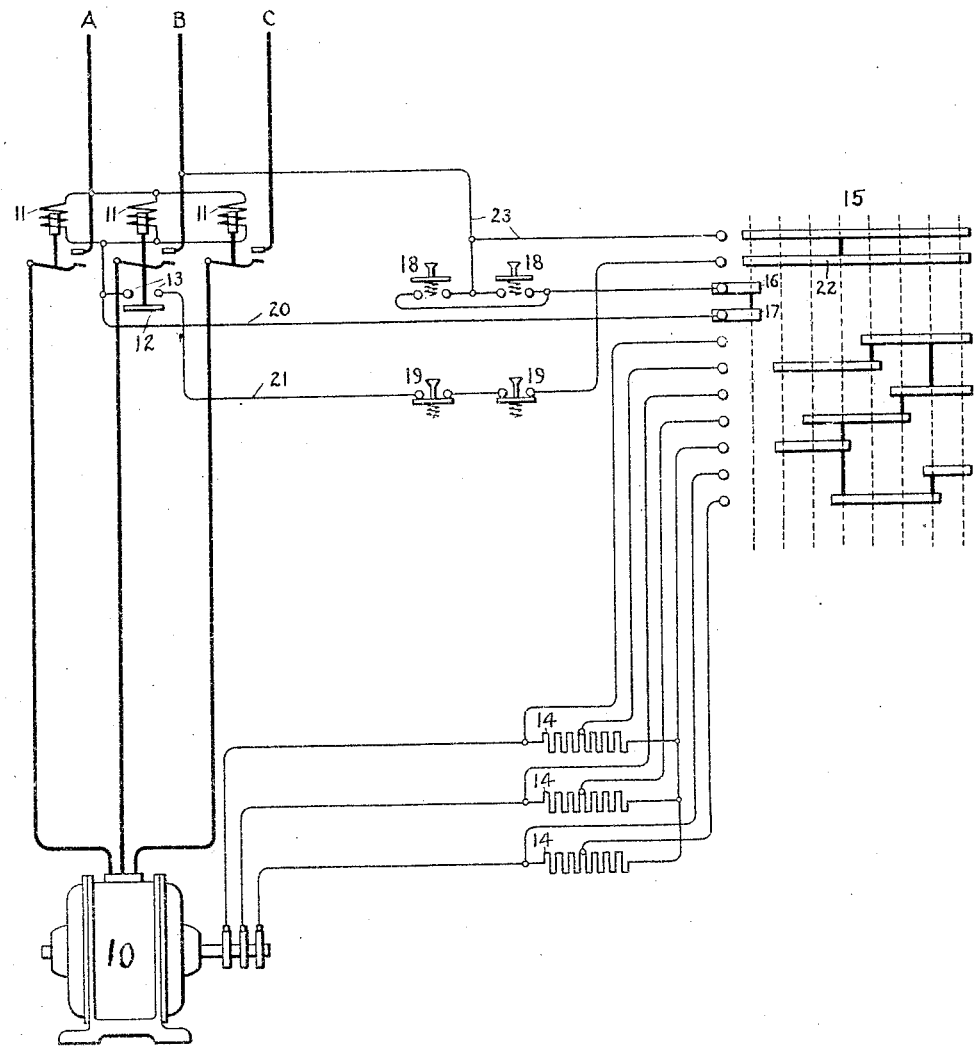

GEORGE T. EAGAR, OF BALLSTON SPA, NEW YORK, ASSIGNOR TO GENERAL ELECTRIC COMPANY, A CORPORATION OF NEW YORK.

MOTOR-CONTROLLING DEVICE.

958,380.     Specification of Letters Patent.    Patented May 17, 1910.

Application filed February 3, 1910. Serial No. 541,790.

*To all whom it may concern:*

Be it known that I, GEORGE T. EAGAR, a citizen of the United States, residing at Ballston Spa, county of Saratoga, State of New York, have invented certain new and useful Improvements in Motor-Controlling Devices, of which the following is a specification.

This invention relates to devices for controlling electric circuits and has for its object the provision of circuit controlling means whereby the motor may be stopped, started, and generally controlled, in a reliable, safe and efficient manner.

My invention relates more specifically to devices for controlling motors which it is desired shall run at a very low speed in addition to the normal running speed, the low speed being controlled at various remote points. Such a system of control is particularly useful in connection with printing presses in which it is desired that means be provided whereby the press may be "jogged" along at its low speed from different points around the press, it being necessary that a certain amount of resistance be in series with the motor during the jogging operation.

Viewed in one aspect my invention comprises a novel control system particularly adapted for alternating current motors.

In carrying out my invention, I provide, in connection with the controlling device for varying the speed of the motor, a plurality of push-buttons around the press which will start the motor at a very low speed when the controlling device is in its initial position. This enables the operator to insert his paper at the low speed without moving the controller. When the machine is ready for normal operation the operator may turn the controller a certain amount so that it will run continuously. As soon as this is done the motor is out of the control of the jogging switches, so that as the speed is increased it can only be stopped by operating certain stop-buttons which are arranged around the press, but cannot be again started without bringing the controlling device back to the initial position.

In the accompanying drawing I have shown my invention embodied in concrete, although somewhat diagrammatic, mechanism for purposes of illustration.

Referring to the drawing, 10 represents an electric motor which I have shown for purposes of illustration as an induction motor of the slip ring type. The primary circuit of this motor is closed by means of electromagnetically actuated switches or contactors 11, one in each phase of the three phase circuit. The three coils of these contactors are connected in parallel and the middle coil provided with an auxiliary contact 12 adapted to bridge the contacts 13 when the contactor is closed. The secondary circuit has connected therein the resistance 14, which is adapted to be varied by means of the controller 15. This controller may be of any well-known type, such, for instance, as the ordinary drum controller. This controller is shown in the drawing as in its off or initial position. In this position, two of the segments 16 and 17 are in engagement with their corresponding contacts, while the remainder of the segments are out of contact.

A plurality of normally open switches or push-buttons 18 are arranged in parallel to control the circuit of contactors 11 through the segments 16 and 17. Any number of these switches may be employed and may be arranged at convenient points, as, for instance, around the printing press the speed of which is to be controlled. A set of normally closed switches or push-buttons 19 are similarly arranged at convenient points to be operated in a manner hereinafter described.

The arrangement of circuits and mode of operation are as follows: Assuming that the controller is in the off or initial position shown in the drawing and it is desired to start the motor to operate the printing press, if the operator presses one of the buttons 18 the primary circuit will be closed through the contactors 11, the circuit being completed as follows: from phase A, through the three coils of the contactors in parallel, thence through the conductor 20, segments 17 and 16, through one of the push-buttons 18 and back to phase B. This closes the primary circuit of the motor and likewise bridges contacts 13. The secondary circuit of the motor is closed through all the resistances 14 so that the motor starts at its lowest speed. When the operator releases the button the motor will immediately stop. In this way the operator is able to jog the press along if desired, until it is ready for normal operation. When this is reached, he goes to the controller, which may be located at a point somewhat distant from the push-buttons and turns it to the first running position. This being done, he may go back and operate one of the push-buttons 18 so as to again start the motor. The circuit of the contactors will still be completed through the contact segments 16 and 17. When he releases the button this time, however, the motor does not stop, since an auxiliary circuit has been completed through the bridging contact 12 as follows: from phase A through the coils of the contactors 11 in parallel, thence through contact 12, conductor 21, push-button 19, across the two segments 22, conductor 23, and back to phase B. The motor will now run continuously at its lowest speed. By turning the controller the resistance 14 may be eliminated from the secondary circuit in the well-known manner, so that the speed may be increased to any desired point. If, at any time during its normal operation, it is desired to stop the motor, one of the buttons 19 is pressed. This opens the primary circuit at the contactors 11 and also opens the circuit through the button 19 at the contacts 13, so that the motor will not be again started when the button 19 is released. To again start the motor the controller must be brought back to the initial position shown in the drawing.

It will be seen that I have provided a simple and efficient arrangement for starting the motor and operating the same both intermittently and continuously, the arrangement being such that it is impossible to start the motor without a certain amount of protective resistance in circuit.

In accordance with the patent statutes, I have shown a specific type of motor and specific apparatus for controlling the same, but it should be understood that I do not limit my invention to the construction or arrangement herein shown and described, since various modifications thereof will suggest themselves to those skilled in the art without departing from the spirit of my invention, the scope of which is set forth in the annexed claims.

What I claim as new and desire to secure by Letters Patent of the United States, is,—

1. The combination with an alternating current motor, of electromagnetic switch mechanism for closing the primary circuit thereof, a resistance for the secondary circuit, a controlling device for varying said resistance and controlling said electromagnetic switch mechanism, and a plurality of manually operated switches for closing a circuit to energize the electromagnetic switch mechanism when the controlling device is in the initial position.

2. The combination with an alternating current motor, or electromagnetic switches for closing the primary circuit thereof, a resistance for the secondary circuit, a plurality of manually operated switches for closing a circuit through the electromagnetic switches with the controlling device in the initial position, and a second set of switches for controlling said electromagnetic switches in a succeeding position of the controlling device.

3. The combination with an alternating current motor, of electromagnetic switch mechanism for closing the primary circuit thereof, a resistance for the secondary circuit, a normally open switch for closing a circuit through the electromagnetic switches with the controlling device in the initial position, and a normally closed switch for controlling the electromagnetic switches in a succeeding position of the controlling device.

4. The combination with an alternating current motor, of electromagnet switches for closing the primary circuit thereof, a resistance for the secondary circuit, a device for controlling said resistance and said switches, a plurality of manually operated switches for opening and closing an energizing circuit of the electromagnetic switches with the controlling device in initial position, and a set of normally closed switches for completing a circuit through the electromagnetic switches with the controlling device in one of its succeeding positions.

5. The combination with an electric motor, of electromagnetic switch mechanism for closing the circuit thereof, a speed controlling device for the motor, a plurality of manually operated switches for controlling said electromagnetic switch mechanism, and connections whereby certain of said switches are operative only in the initial position of the controlling device to open and close the motor circuit while others are operative only in successive positions of the controlling device to open and not close the motor circuit.

6. The combination with an alternating current motor, of electromagnetic switches for closing the primary circuit thereof, a resistance for the secondary circuit, a controlling device for varying said resistance, manually operated switches for controlling said electromagnetic switches, and connections whereby certain of said manual switches are operative only in initial position of the controlling device to open and close the motor circuit while others are operative only in successive positions of the controlling device to open but not close the motor circuit.

7. The combination with an electric motor, of electromagnetic switch mechanism for controlling the circuit thereof, a speed controlling device, a plurality of normally open switches for controlling said switch mechanism to open and close the motor circuit at a low speed position of the controlling device, means operative upon the moving of the controlling device to a higher speed position for establishing a holding circuit for said switch mechanism which is independent of said switches, and a plurality of normally closed switches for opening the circuit so established.

8. The combination with an electric motor, of electromagnetic switch mechanism for controlling the circuit thereof, a speed controlling device, a manually operated switch for controlling said switch mechanism to open and close the motor circuit in a low speed position of the controlling device, means operative upon the moving of the controlling device to a higher speed position for establishing a holding circuit for said switch mechanism which is independent of said manual switch, and a second manually operated switch for opening the circuit so established.

9. The combination with an alternating current motor, of electromagnetic switches for controlling the primary circuit thereof, a resistance for the secondary circuit, a controlling device therefor, a plurality of normally open switches for controlling said switch mechanism to open and close the motor circuit at a low speed position of the controlling device, means operative upon the movement of the controlling device to a higher speed position for establishing a holding circuit for said switch mechanism which is independent of said switches, and a plurality of normally closed switches for opening the circuit so established.

10. The combination with an alternating current motor, of electromagnetic switches for controlling the primary circuit thereof, a resistance for the secondary circuit, a controlling device therefor, a plurality of normally open manually operated switches for controlling the electromagnetic switches to open and close the motor circuit in a low speed of the controlling device, means operative upon the moving of the controlling device to a higher speed position for establishing a holding circuit for said electromagnetic switches which is independent of said manual switches, and a plurality of normally closed manually operated switches for opening the circuit so established.

In witness whereof, I have hereunto set my hand this 1st day of February, 1910.

GEORGE T. EAGAR.

Witnesses:
  BENJAMIN B. HULL,
  HELEN ORFORD.